Figure 1:
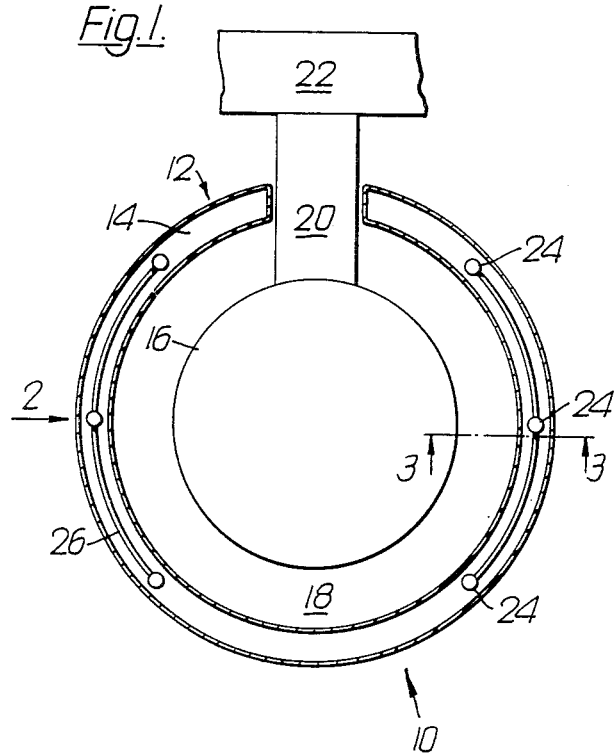

United States Patent [19]

Carlin

[11] 4,216,909
[45] Aug. 12, 1980

[54] BRAKE MECHANISM FOR ROTARY PARTS

[75] Inventor: Robert N. Carlin, Nutthall, England

[73] Assignee: Rolls-Royce Limited, London, England

[21] Appl. No.: 946,075

[22] Filed: Sep. 26, 1978

[30] Foreign Application Priority Data

Oct. 4, 1977 [GB] United Kingdom ............... 41138/77

[51] Int. Cl.² ............................................. B64C 15/04
[52] U.S. Cl. ................................. 239/265.31; 192/8 R
[58] Field of Search ...................... 192/8 R; 188/134; 239/265.31

[56] References Cited

U.S. PATENT DOCUMENTS

| 2,240,932 | 5/1941 | Kinser | 192/8 R |
| 3,237,735 | 3/1966 | Jayne | 192/8 R |
| 3,449,978 | 6/1969 | Stimpson | 192/8 R X |
| 3,976,172 | 8/1976 | Geppert | 192/8 R |
| 4,047,682 | 9/1977 | Brownhill | 239/265.31 X |

Primary Examiner—Richard A. Schacher
Attorney, Agent, or Firm—Cushman, Darby & Cushman

[57] ABSTRACT

In a thrust reverser translating mechanism, a drive shaft and a driven shaft are connected so as to permit a small degree of relative rotation. A pawl is pivotally connected to the driven shaft and an annular ratchet surrounds it. If the drive shaft controls the speed of rotation, it takes up the free movement and in so doing, moves the pawl out of engagement with the ratchet. If the driven shaft attempts to rotate faster than the drive shaft, it takes the pawl away from its engagement with the drive shaft and allows resilient means to urge the pawl into engagement with the ratchet thus stopping rotation of the driven shaft until the drive shaft catches up and disengages the pawl from the ratchet again.

4 Claims, 9 Drawing Figures

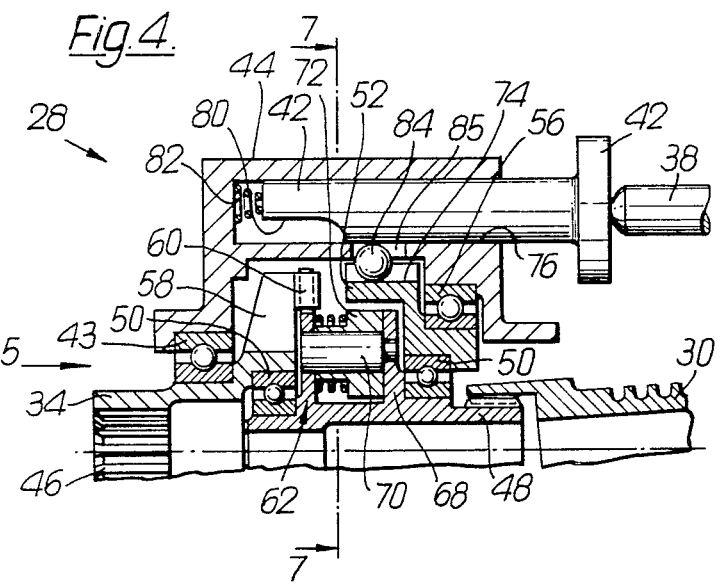
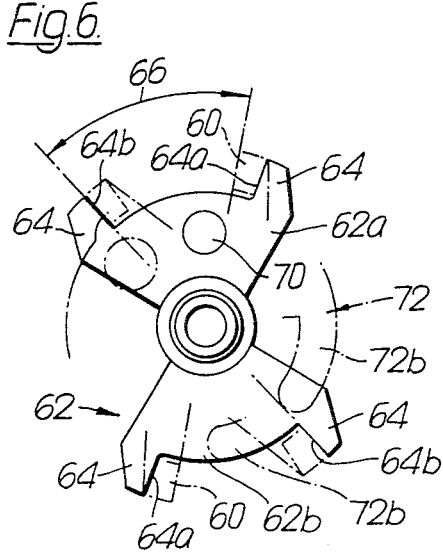
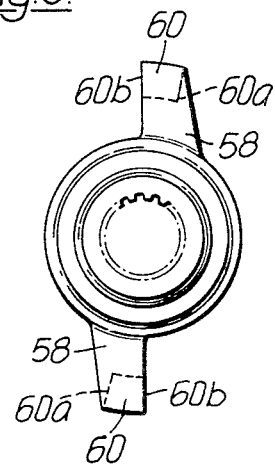

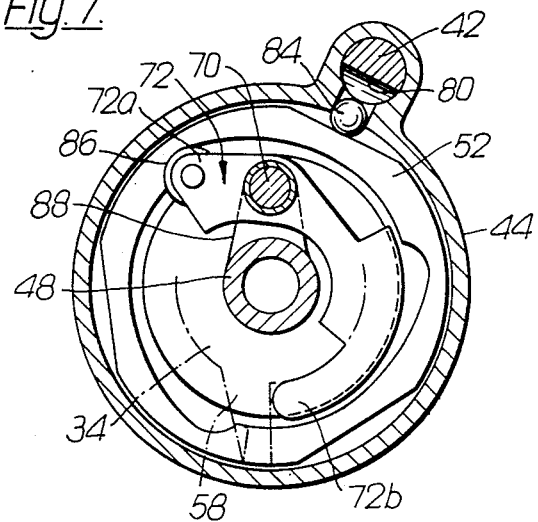
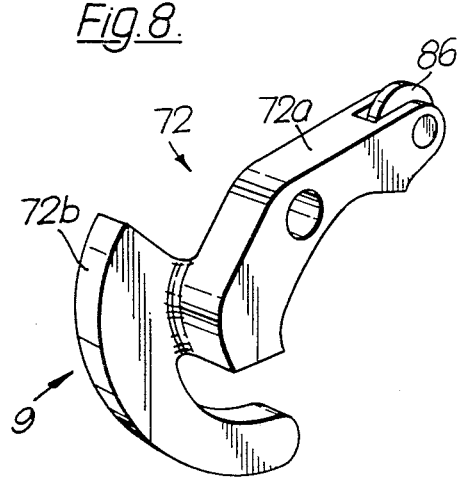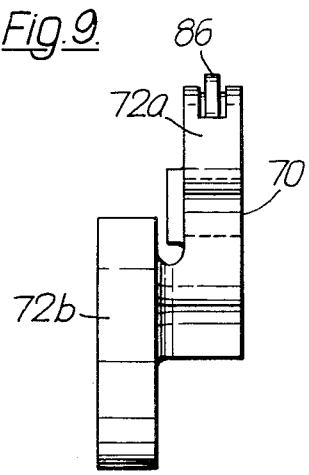

BRAKE MECHANISM FOR ROTARY PARTS

This invention concerns apparatus for braking rotary parts.

Drive units of the kind where one shaft transmits rotary motion to another shaft via a mechanical connection, are frequently used in situations where it is possible, but most undesirable, for the roles of the two shafts to be reversed i.e. for a load to be applied such that the driven shaft becomes the drive shaft.

One example is where a shaft transmits rotary drive to another shaft, i.e. the hub of a road wheel, so as to drive a vehicle. The rotary speed of the driving shaft dictates the rotary speed of the hub shaft and its associated wheel. If however, the drive shaft or its prime mover, breaks at a time either when the vehicle is moving or is at rest on an incline, the wheel and its associated hub shaft commence driving the drive shaft. Thus, the ability to control rotary speed is lost.

A further example is in the field of jet propulsion and ducted fan propulsion engines for aircraft, which clearly indicates the broad utility possessed by the invention to be described herein.

It is common practice to adapt the streamlined cowl which surrounds such an engine, so that a part of the cowl moves with respect to the remainder. A gap is opened and, hot gas or fan air is deflected through the gap to atmosphere. In this manner thrust from the engine is effectively reduced.

The movable cowl part is moved by screw jacks which on rotation, act via ball nuts to move the movable cowl part, axially of the engine.

The screw jacks are effectively driven shafts, which derive their rotary motion from drive shafts which in turn, are motor driven via gearing and/or flexible couplings.

In operation, gases or fan air tends to leak between the interface of the fixed and movable cowl parts. This phenomena exerts a load on the movable part, in a direction which biases the movable part to an open position. However, whilst the mechanism as a whole maintains its integrity, the cowl portions when closed, will stay closed.

In the event of a failure in the drive system, during flight of an aircraft, it is quite possible that the gas/air loads mentioned hereinbefore, would be of such magnitude as to react on the screw jacks via the ball nuts and cause them to rotate, thus winding the ball nuts along their lengths and moving the movable cowl part to open the gap. Clearly, the normally driven screw jacks will then be driving the drive shafts, with consequent loss of control.

It is an object of this invention to provide a shaft drive system in which in the event of driving and driven shaft roles being reversed through breakdown, shaft rotation is controlled to the extent that it is stopped.

According to the present invention there is provided an assembly comprising a first drive shaft, a second shaft to be driven by said first shaft, fixed structure in which said first and second shafts are rotatably mounted, a locking ring rotatably mounted between said second shaft and fixed structure, means for engagement with said locking ring and the fixed structure to enable prevention of rotation of said locking ring and means for engagement with said second shaft and said locking ring to enable prevention of rotation of said second shaft, the arrangement being such that both means simultaneously engage their respective fixed structure and ring only if said second shaft transmits drive to said first shaft.

Figure 2:
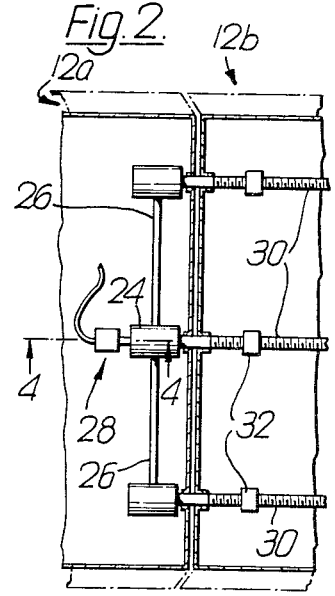
Figure 3:
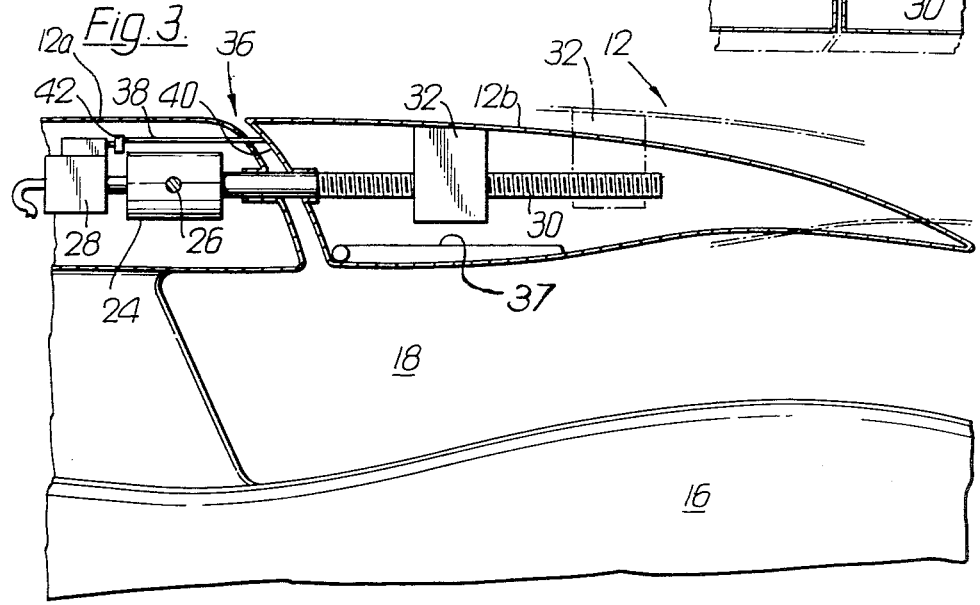

The invention will now be described by way of example, with reference to the accompanying drawings in which:

FIG. 1 is a diagrammatic cross-sectional view through a ducted fan gas turbine engine, FIG. 2 is a view in the direction of arrow 2 of FIG. 1, FIG. 3 is a view on line 3—3 of FIG. 1, FIG. 4 is a view on line 4—4 of FIG. 2, FIG. 5 is a part view in the direction of arrow 5 in FIG. 4, FIG. 6 is a part view in the direction of arrow 6 in FIG. 4, FIG. 7 is a view on line 7—7 in FIG. 4, FIG. 8 is a pictorial view of part of the apparatus of FIG. 7, and FIG. 9 is a view in the direction of arrow 9 in FIG. 8.

In FIG. 1, the numeral 10 generally indicates a ducted fan gas turbine engine power plant, in which an outer cowl 12 has a double wall with a space 14 therebetween.

The gas turbine portion is represented by circle 16 and the engine and cowl are separated to form a fan air duct 18.

The power plant is suspended from a pylon 20 which in turn, is fastened to an aircraft wing 22.

Six gear boxes 24 are arranged in space 14, in a pattern which is symmetrical with respect to the power plant vertical centre line. The pattern consists of three gear boxes on each side of the power plant and, the gear boxes in each group of three are joined by flexible drive cables 26. The central gear box of each group receives a drive from power means (not shown) via a brake mechanism 28 (FIG. 2) which will be described hereinafter.

Referring now to FIG. 2, cowl 12 is divided into a fixed portion 12a and translating portion 12b and the latter contains the free ends of six screw jacks 30. Portion 12b also has six ball screws 32 fixed to it, through which respective screw jacks 30 are threaded. The captive ends of the screw jacks are indirectly connected with stub shafts 34 (FIG. 4) forming part of the gears (not shown) in boxes 24. Thus in operation, the gears (not shown) transmit rotary drive through stub shafts 34 (FIG. 4) to screw jacks 30 which themselves, are in effect, shafts with threads formed thereon. On rotation, the screw jacks will move cowl portion 12b towards or away from cowl portion 12a depending on the direction of rotation, to close or open a gap 36 through which fan air can pass to atmosphere when the thrust reverser shown schematically at 37 pivots across the duct 18.

In FIG. 3, cowl portions 12a, 12b and a ball nut 32 are shown more clearly. There is also shown a spindle 38, fixed to and protruding away from, the abutment face 40 of cowl portion 12b. When the cowl portions abut, the free end of the spindle engages the head of a plunger 42, which forms part of brake mechanism 28 and presses the plunger into the structure comprising the brake mechanism. The reason for this will be explained hereafter.

Referring now to FIG. 4, the brake mechanism has a first shaft 34 which is freely rotatably mounted in a bearing race 43 in a casing or housing 44. Shaft 34 has internal splines 46 at its outer end for connection to the stub shaft (not shown) of a gear wheel (not shown). A second shaft 48 is also provided and this too is freely rotatable in further bearing races 50. Races 50 are supported by shaft 34 and a locking ring 52. Shaft 48 has external splines at its outer end, by which it is connected to a screw jack 30, which is positioned between two other screw jacks.

Locking ring 52 is supported for rotation, by a bearing race 56 in casing 44.

First shaft 34 has a pair of legs 58 projecting radially therefrom, in a manner depicted most clearly in FIG. 5. One of the legs can also be seen in FIG. 4. Each leg terminates in a lug 60 having opposed driving faces 60a, 60b.

Each driving face lies in a plane which passes through the centre of the shaft. Thus faces 60a are on a common plane and faces 60b are on a further common plane.

Second shaft 48 has a pair of flanges, the left hand one of which, as viewed in FIG. 4 is indicated by the numeral 62. Flange 62 is in the form of two diametrically opposed wings 62a, 62b (FIG. 6) and each wing has its periphery partly relieved, to provide upstanding portions 64. The upstanding portions have driven faces 64a, 64b and first shaft 34 is arranged coaxially with second shaft 48, such that its lugs 60 lie between the upstanding portions. Thus in operation, if first shaft 34 is rotated, then depending on the direction of its rotation, either its driving faces 60a will engage second shaft faces 64a or its driving faces 60b will engage second shaft faces 64b and so rotate the second shaft 48. However, it should be appreciated that first shaft 34 can rotate through an arc of magnitude indicated at 66, before engagement takes place, this for reasons explained later in this specification.

The right hand flange 68 of shaft 48, as viewed in FIG. 4, is truly circular. An axle 70 is fixed between flanges 68 and 62 and a pawl 72 is freely pivotally mounted on the axle. Pawl 72 is shown more clearly in FIGS. 7 to 9.

Referring again to FIG. 4, the locking ring 52 has a bore within which pawl 72 nests and the outer periphery of the locking ring is provided with a number of flats 74.

Casing 44 has a bore 76 which is offset from the main body of the casing and the plunger 42 is slidingly fitted in it. The plunger has its inner end relieved at 80 and a coil spring 82 applies a force to the plunger which attempts to urge it out of bore 76.

A ball 84 rests on the uppermost one of flats 74 and protrudes through a hole 85 in the casing and frictionally engages the underside of plunger 42. By this means, ring 52 is prevented from rotating relative to the casing.

Referring now to FIG. 7. Pawl 72 is curved and its upper end carries a roller 86. Further, axle 70 is positioned close to roller 86 so that if pawl 72 pivots on the axle in an anti-clockwise direction, roller 86 will be swung out of engagement with the scalloped inner periphery of locking ring 52.

The lower half 72b of the pawl is displaced laterally of the upper half 72a (FIGS. 8 and 9). This arrangement permits the upper half to be located on one side of wing 62a on the second shaft 62 so as to align with the inner periphery of locking ring 52 and, the lower half to be located on the other side of wing 62b of the same shaft, so as to be engageable by the lower leg 58 of the first shaft 34, as explained hereafter.

A spring mechanism 88 at all times urges the pawl end 72a outwards of the assembly, so as to cause roller 86 to nest in one of the scallops of the inner periphery of locking ring 52. The spring action puts a turning moment on the pawl, in a clockwise direction as viewed in FIG. 7.

When it is desired to open gap 36, the drive means (not shown) is actuated, to rotate gears 24 and their associated screw jacks, via brake mechanism 28 as follows:

The drive means rotates first shaft 34 in an anticlockwise direction as viewed in FIGS. 6 and 7. Lower leg 58 moves over relieved portion of wing 62b and first contacts the lower end 72b of pawl 72 and pivots the pawl out of engagement with locating ring 52. Second shaft 48 can now be rotated.

Drive faces 60b of the lugs 60 on first shaft 34 then engage driven faces 64b of upstanding portions 64 on second shaft 48 and thereby commences rotating second shaft 48 which of course, transmits the drive to screw jacks 30 via gear boxes 24. The screw jacks react on the ball nuts 32 and move cowl portion 12b to open gap 36.

As cowl portion 12b is moved to the right as viewed in FIG. 3, it takes spindle 40 with it, thus allowing plunger 42 to be urged along bore 76 of casing 44 (see FIG. 4), by coil spring 82, until it disengages from ball 84. The ball is now free to move into bore 76, should force be exerted on it by locking ring 52, if the ring attempts to rotate through bearing race 50. However it is not necessary for locking ring 52 to rotate.

Closure of the gap is achieved by reversal of rotation of first shaft 34. When this occurs, lower leg 58 of shaft 34 will rotate clockwise and disengage the lower end 72b of pawl 72, thus allowing spring 88 to urge roller 86 against the inner periphery of locking ring 52. However, no positive drive is transmitted to the locking ring for the roller will simply move in and out of successive scallops as the pawl rotates in a clockwise direction. (See FIG. 7).

Eventually, as the gap nears closure, spindle 42 will be pushed into bore 76, until it reaches ball 84. It may be that due to friction in the bearings, some rotation of locking ring 52 takes place, so that ball 84 rests on a circular portion of its outer periphery. If this is so at the time of plunger 42 reaching the ball, it will roll the ball along the elongate hole 85, giving the locking ring more time to rotate further and so align a flat portion of its outer periphery with the hole. On this being achieved, ball 84 will drop onto the flat as in FIGS. 4 and 7 and plunger 42 will move over it as gap 36 fully closes.

When the gap is fully closed, a brake (not shown) is applied to the power means (not shown), which ensures that the drive torque applied to the screw jacks, is maintained when the apparatus is static.

It is when an aircraft is in flight, with its cowls in the closed position, that serious trouble can accrue, if there is a breakdown in the drive system, between the power means and gear boxes 24. Should this occur, air or gas loads on the cowl are such that cross flows set up at the interface of the cowl portions 12a, 12b and the forces generated thereby, could be sufficient to force the cowl portion 12b to a position which opens gaps 36. In this event, the aircraft would lose a substantial amount of forward thrust from the relevant engine.

When the cowl portion moves under fluid flow loads, it causes ball screws 32 to transmit a rotary force to their respective screw jacks. The screw jacks in turn transmit torque via second shaft 48 to first shaft 34. The roles of the shafts are therefore effectively reversed.

Referring now to FIG. 6, on rotation of second shaft 48 in an anticlockwise direction, which is necessary for the gap 36 to open, it will be seen that upstanding portions 64 on second shaft 48, are driving lugs 60 on first shaft 34. At the same time, second shaft 48 carries pawl 72 on axle 70, with it and spring 88 (FIG. 7) is forcing the upper end of the pawl outwards. Thus, when the first scallop is reached by the roller 86 as the pawl rotates relative to locking ring 52, the spring forces the roller into the scallop (FIG.7) which joins the second shaft against further rotation relative to locking ring 52. However, as locking ring 52 is also jammed against rotation relative to casing 44, by virtue of the ball 84 being trapped against a flat on the outer periphery of the locking ring, it is clear that no rotation whatever is possible. Cowl portion 12b is now securely locked against translation and gap 36 is prevented from widening to proportions which cause danger.

It would be possible to dispense with the locking ring 52 as a separate entity. However, the fluid loads on the cowl portion 12b, when the mechanism is working normally, are such that, on opening of the gap, the cowl attempts to move faster than the drive mechanism is driving it. It follows that a reversal of direction of loading takes place across the first and second shafts. This results in the second shaft rotating pawl 72 out of contact with the lower leg 58 of shaft 34, thus permitting the spring 88 to urge roller 86 into a scallop. Jamming of the second shaft 48 to the locking ring occurs and if the locking ring could not rotate, cowl portion 12b would become stuck in a wrong position until the first shaft had rotated through arc 66 and re-engaged lower end 72b of the pawl, to disengage it. Progress of cowl portion 12b to the fully open position would consequently be erratic.

I claim:
1. An assembly comprising:
a gas turbine engine cowl having a fixed portion and a translatable portion, at least one housing mounted within said engine cowl, first and second shafts mounted for coaxial rotation in said housing and being drivingly engageable with each other, said first shaft having at least one radially extending end portion for driving cooperation with said second shaft, said second shaft having at least one radially extending portion with a pair of angularly spaced faces between which said at least one radially extending end portion of said first shaft lies, the angular spacing of said faces being such as to permit limited relative rotation between said first and second shafts before driving engagement occurs in either direction, abutment means between said second shaft and said housing and including an annular ratchet supported within said housing for rotation relative thereto, wedging means for wedging said annular ratchet to said housing to prevent the relative rotation, said wedging means being movable to avoid said wedging, abutting means pivotally mounted on said second shaft for engagement with said abutment means to prevent rotation of said second shaft and engageable with said first shaft so as to be urged out of the abutting engagement when said first shaft drives said second shaft in one direction, said abutting means including a pawl pivotally positioned on said second shaft and having one end engageable by said first shaft, and resilient means urging said abutting means into abutting engagement with said abutment means as the roles of said first and second shafts are reversed, said resilient means being overridden when said pawl is pivoted out of engagement with said ratchet durng driving of said second shaft by said first shaft.

2. An assembly as claimed in claim 1 wherein said resilient means comprises a spring fixed between said pawl and said second shaft so as to urge said pawl into engagement with said ratchet if the roles of said shafts are reversed.

3. An assembly as claimed in claim 1 including a screw jack operatively connected to said second shaft for rotation thereby when said shaft is rotated by said first shaft, said screw jack being operatively connected to said translatable portion of said cowl for moving the same relative to said fixed portion and for causing said wedging means to move into and out of wedging engagement with said annular ratchet.

4. An assembly as claimed in claim 3 including a thrust reverser mechanism which when non-operative is surrounded by said cowl.

* * * * *